…

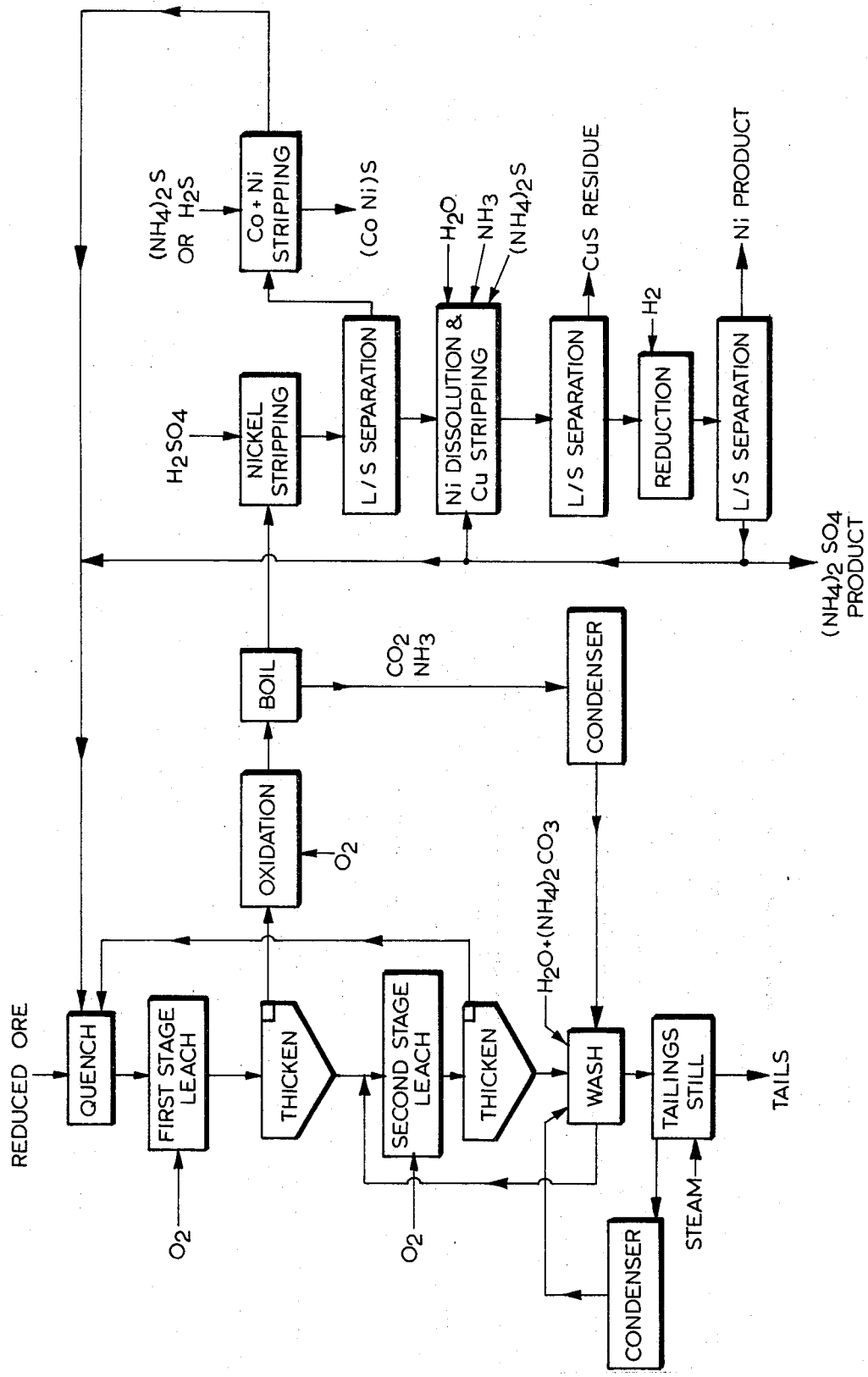

United States Patent Office 3,767,762
Patented Oct. 23, 1973

3,767,762
RECOVERY AND SEPARATION OF NICKEL AND COBALT FROM REDUCED LATERITE NICKEL ORE
Wasyl Kunda, Fort Saskatchewan, Alberta, Canada, assignor to Sherritt Gordon Mines Limited, Toronto, Ontario, Canada
Continuation-in-part of abandoned application Ser. No. 103,110, Dec. 31, 1970. This application Jan. 4, 1972, Ser. No. 215,387
Int. Cl. C22b 3/00
U.S. Cl. 423—145    9 Claims

ABSTRACT OF THE DISCLOSURE

The process of this invention involves the utilization of an aqueous ammoniacal solution of ammonium carbonate and ammonium sulphate to leach nickel and cobalt from lateritic or garnieritic ore which has been roasted under controlled conditions to selectively reduce contained nickel and cobalt to crude metallic form. Undissolved residue is separated from the leach solution and is reacted with free oxygen bearing gas to oxidize dissolved cobalt values to the cobaltic state and to convert unsaturated sulphur values to the sulphate form. The solution is then heated to a temperature above its boiling point to drive off free ammonia and substantially all carbon dioxide. The expelled ammonia and carbon dioxide gases are recycled to the leaching operation and the resulting substantially ammonium carbonate-free nickel and cobalt bearing ammoniacal ammonium sulphate solution is passed to nickel and cobalt recovery operations wherein these metals are recovered with concurrent production of a metals-depleted solution containing ammonium sulphate. This end solution is recycled to the leaching operation in amount sufficient to provide the ammonium sulphate requirements of that operation.

---

This application is a continuation-in-part of application Ser. No. 103,110, filed Dec. 31, 1970, now abandoned.

This invention relates to a method of extracting and recovering nickel and cobalt values from nickel and cobalt containing lateritic and garnieritic ores. More particularly, the invention is concerned with a process for treating such ores whereby cobalt recovery is maximized and the bulk of the nickel values are recovered substantially free of cobalt contamination.

Nickel and cobalt bearing lateritic and garnieritic ores constitute an important source of nickel and cobalt. Owing to the complex metallurgy of the ores and their low nickel and cobalt contents, treatment of these ores for recovery of contained nickel and cobalt present special problems which have not been satisfactorily solved by conventional metallurical processes.

One process which has been commercially employed for the extraction and recovery of nickel from lateritic and garnieritic ores involves roasting the ores under reducing conditions to reduce the nickel oxide in the material to a crude metallic state. The reduced ore is leached in the presence of free oxygen with an aqueous ammoniacal ammonium carbonate solution to extract the metallic nickel and dissolve it in the leach solution as nickel ammine carbonate. Undissolved residue is separated from the leach solution and the decanted solution is heated to drive off ammonia and carbon dioxide and to precipitate dissolved nickel as basic nickel carbonate. Precipitated basic nickel carbonate is separated from the solution and is decomposed by heating to form nickel oxide. The oxide normally is marketed as such although it may also be reduced to metallic nickel for use in that form.

A number of problems are encountered in carrying out this process, the most serious of which being low cobalt recoveries and cobalt contamination of the nickel product. These problems have been overcome to a large extent by more recently developed processes such as those described in Canadian Pat. No. 811,078 and Canadian Pat. No. 854,116. The process of Pat. No. 854,116 involves two important departures from the conventional practice outlined in the preceding paragraph. Firstly, cobalt is selectively stripped from the ammoniacal ammonium carbonate leach solution by reacting it with a sulphidizing agent such as $H_2S$ or $(NH_4)_2S$ to precipitate cobalt as a sulphide; secondly, nickel is recovered from the cobalt free solution by reacting it after appropriate adjustment of its composition with hydrogen at elevated temperature and pressure to reduce dissolved nickel values and precipitate them in elemental powder form. In Pat. No. 811,078, similar cobalt removal and direct hydrogen reduction operations are described but, in addition, the initial cobalt content of the ammoniacal ammonium carbonate leach solution is specifically controlled, by means of the cobalt removal operations, below about 0.2 gram per litre (g.p.l.) to maximize cobalt extraction from the reduced ore.

In practice, however, difficulties are encountered in effecting selective removal of cobalt from nicket and cobalt bearing ammonium carbonate solutions by reaction with sulphidizing agents. Sulphidizing agents are only partially effective to preferentially precipitate cobalt from nickel bearing ammoniacal ammonium carbonate solutions. A significant proportion of the dissolved cobalt values remains in solution and either contaminates the product nickel subsequently recovered from the solution or is not recovered in any valuable form. Moreover, the sulphidizing agent generally precipitates nickel in an amount approximately equal to or greater than the amount of precipitated cobalt. Any nickel so precipitated with the cobalt may constitute an appreciable economic loss since the value of nickel in a mixed nickel-cobalt sulphide precipitate is much less than the value of elemental nickel product recovered from the solution.

The cobalt content of the solution can be decreased to a very low level by adding sulphidizing agent in large excess over the theoretical amount necessary to precipitate all cobalt. However, such excess sulphidizing agent causes a significant proportion of the nickel in solution to coprecipitate with the cobalt in the form of a mixed nickel-cobalt sulphide. Customarily, therefore, only enough sulphidizing agent is added to solution derived from leaching reduced lateritic and garnieritic ores to increase the nickel to cobalt ratio in solution to about 1000:1 and by so doing the nickel to cobalt ratio in the mixed cobalt-nickel sulphide product is usually at least about 4:1.

The present invention provides a process for treating lateritic and garnieritic ores which significantly increases cobalt extraction therefrom while, at the same time, permitting recovery of substantially all extracted nickel as a metallic product substantially free from cobalt contamination. According to one preferred embodiment of the invention, product nickel obtained contains about 0.005% cobalt or even less representing a nickel to cobalt ratio of 20,000:1 or higher. The invention is also concerned with recovery of cobalt in the form of a mixed nickel cobalt sulphide having a nickel to cobalt ratio of 1.5 or lower.

Briefly stated, the process of this invention involves the utilization of an aqueous ammoniacal solution of ammonium carbonate and ammonium sulphate to leach nickel and cobalt from lateritic or garnieritic ore which has been roasted under controlled conditions to selectively reduce contained nickel and cobalt to crude metallic form. Undissolved residue is separated from the leach solution and is reacted with free oxygen bearing gas to oxidize dissolved cobalt values to the cobaltic state and to convert unsaturated sulphur values to the sulphate form. The solution is then heated to a temperature above its boiling point to drive off free ammonia and substantially all carbon dioxide. The expelled ammonia and carbon dioxide gases are recycled to the leaching operation and the resulting substantially ammonium carbonate-free nickel and cobalt bearing ammoniacal ammonium sulphate solution is passed to nickel and cobalt recovery operations wherein these metals are recovered with concurrent production of a metals-depleted solution containing ammonium sulphate. This end solution is recycled to the leaching operation in amount sufficient to provide the ammonium sulphate requirements of that operation.

According to a preferred procedure, nickel and cobalt are separately recovered from the solution from the boiling operation by first adding sulphuric acid to the ammonium carbonate-free solution in sufficient quantity to precipitate the bulk of the dissolved nickel values as a complex nickel sulphate ammonium sulphate salt. The complex salt is separated from solution and the solution is contacted with a sulphidizing agent selected from the group consisting of hydrogen sulphide, ammonium sulphide, sodium sulphide and sodium sulphydrate to precipitate dissolved cobalt and any nickel remaining in solution as a mixed cobalt nickel sulphide product. The complex nickel sulphate ammonium sulphate salt is dissolved in an aqueous ammoniacal solution and nickel is recovered from said solution with concurrent production of ammoniacal ammonium sulphate solution.

The process of this invention is described in detail hereinafter, reference being made to the accompanying drawing which is a flow sheet illustrating a specific overall scheme which incorporates the invention.

Prior to treatment by the process of the invention, the ore is subjected to a preliminary drying and reduction roasting operation. In the drying operation, the moisture content of the ore preferably is decreased to about 5% and in the reduction roasting operation, a reducing agent such as hydrogen or carbon monoxide is employed to reduce the nickel and cobalt oxides to a crude metallic state with minimum accompanying reduction of iron values to the metallic state. The drying and reduction roasting steps are known procedures and are described in a number of publications including Canadian Patent No. 811,978.

Referring to the drawing, the reduced ore is first quenched in solution recycled from the nickel recovery and second stage leach operations to form a slurry which contains about 20% to about 40% solids. The slurry should contain about 2 to 5 moles of free ammonia, at least 1 mole, preferably at least 2 moles of ammonium carbonate per mole of nickel plus cobalt and at least 10 moles of ammonium sulphate per mole of nickel and cobalt. The required ammonia and ammonium carbonate concentrations are obtained by recycle of ammonia and carbon dioxide from the boiling step to the washing step and, if necessary, by adding make-up ammonium carbonate solution in the washing step. Ammonium sulphate concentration is controlled through control of the quantity of solution recycled from the metals recovery operation.

The quench slurry is passed to the first stage leaching step where a free oxygen-containing gas is introduced into the leach solution to facilitate the leaching reaction. The gas is usually air and is sparged into the leaching vessel. As the leaching operation progresses, the bulk of the divalent cobalt values oxidizes to a trivalent state.

The leaching operation is conducted at a temperature of from about 80° F. to about 200° F. If the temperature of the leach solution is above about 200° F., the ammonium carbonate and free ammonia tend to go into a vapor phase and generate high pressures and, unless ambient temperatures are extremely low, considerable cooling is required to maintain the temperature towards the lower end of the above indicated range. Accordingly, the preferred temperature for the leaching operation is 90° F. to about 120° F.

It is desirable to operate the leaching operation on a two-stage basis as shown in the drawing because of the relatively low nickel and cobalt contents of the calcine and the practical requirements of maintaining the pulp density of the leach slurry below 40% solids. In so doing, the nickel and cobalt content of the solution may be built up to a level at which the nickel and cobalt can be economically recovered in the subsequent steps. Pregnant solution and residue from the first stage leach are separated in a thickener and the residue is passed to the second stage leach. Residue from the second leaching stage is separated from solution and passed to a washing step while solution from the second leaching stage is passed to the quench step. In the washing step, the residue from the second leaching stage is washed with make-up ammonium carbonate solution and condensate recycled from the boiling step. Washed residue is treated with steam in a tailings still and condensate from this operation is also recycled to the washing step.

Utilization of a mixed ammonium carbonate-ammonium sulphate system in the leaching operation as just described results in a substantial increase in cobalt extraction over that obtainable with the conventional ammonium carbonate leach. This improvement is illustrated by the results of two tests in which samples of reduced laterite ore were subjected to: (1) a standard leach in ammonium carbonate solution, and (2) a leach in ammonium carbonate-ammonium sulphate solution. Each test consisted of six leaching stages with recycling of the leach solution from each stage to leach fresh calcine in a subsequent stage. The procedure was as follows: 10,000 grams of reduced laterite ore (calculated on a dry basis and containing by weight 1.7% Ni, 0.15% Co and 40.3% Fe) were charged into a 25 gallon agitator-equipped autoclave along with 60 litres of solution containing 60 g.p.l. $CO_2$ and 80 g.p.l. $NH_3$ in test (1) and 60 g.p.l. $CO_2$ 80 g.p.l. $NH_3$ and 200 g.p.l. $(NH_4)_2SO_4$ in test (2). Leaching conditions for each stage were: temperature—110° F., oxygen pressure—5 p.s.i.g., time—3 hours. At the end of each leaching stage, the slurry was discharged, allowed to settle, clear solution was decanted, volume was adjusted back to 60 g.p.l. with fresh ammonium carbonate solution and this solution was used to leach a fresh charge of reduced ore in the next stage. The extractions of nickel and cobalt in each leaching system were calculated for each leach test and the results are shown in Table I.

TABLE I

| System | Leach number | Leach residue (percent) | | | Leach solution (g.p.l.) | | | | Extraction, percent | |
|---|---|---|---|---|---|---|---|---|---|---|
| | | Ni | Co | Fe | Ni | Co | $CO_2$ | $NH_3$ | Ni | Co |
| | | Starting leach solution: 60 g.p.l. $CO_2$ plus 80 g.p.l. $NH_3$ | | | | | | | | |
| $NH_3$—$(NH_4)CO_3$ | 1 | 0.26 | 0.081 | 41.71 | 2.21 | 0.074 | 77 | 87 | 85.6 | 48.4 |
| | 2 | 0.23 | 0.100 | 46.78 | 3.86 | 0.208 | 57 | 83 | 88.5 | 44.4 |
| | 3 | 0.23 | 0.106 | 45.61 | 4.58 | 0.237 | 48 | 78 | 88.0 | 37.7 |
| | 4 | 0.26 | 0.102 | 42.23 | 5.47 | 0.279 | 69 | 84 | 85.5 | 35.8 |
| | 5 | 0.29 | 0.117 | 42.74 | 6.38 | 0.331 | 56 | 72 | 83.7 | 26.5 |
| | 6 | 0.26 | 0.105 | 44.10 | 6.68 | 0.328 | 56 | 75 | 86.0 | 36.5 |
| | | Starting leach solution: 60 g.p.l. $CO_2$ plus 80 g.p.l. $NH_3$ plus 200 g.p.l. $(NH_4)_2SO_4$ | | | | | | | | |
| $NH_3$—$(NH_4)CO_3$ plus $(NH_4)_2SO_4$ | 1 | 0.19 | 0.038 | 39.8 | 1.75 | 0.199 | 66 | 80 | 89.0 | 74.0 |
| | 2 | 0.19 | 0.038 | 41.2 | 3.47 | 0.361 | 58 | 75 | 88.7 | 76.0 |
| | 3 | 0.20 | 0.039 | 41.4 | 4.86 | 0.465 | 58 | 77 | 88.5 | 74.8 |
| | 4 | 0.22 | 0.046 | 39.5 | 6.01 | 0.535 | 52 | 75 | 86.5 | 69.0 |
| | 5 | 0.20 | 0.039 | 40.7 | 6.25 | 0.574 | 60 | 78 | 88.0 | 74.5 |
| | 6 | 0.19 | 0.038 | 43.4 | 7.02 | 0.635 | 57 | 75 | 89.5 | 76.6 |

*Calculated on a residue basis.

It can be observed from these results that the weight percent of cobalt extracted from the calcine was more than doubled through the use of the mixed ammonium carbonate-ammonium sulphate system. Further, with the standard ammonium carbonate system cobalt extractions actually tend to decrease with each subsequent leach stage using solution from the previous leach stage whereas with the mixed system of the invention extractions remain substantially constant.

Referring again to the drawing, it can be seen that in the process illustrated, leach solution which contains dissolved nickel and cobalt values is passed to an oxidation step. In this step, the solution is maintained at a temperature of about 200° F. to about 250° F. and a free oxygen-containing gas such as air is sparged into the oxidation vessel. The oxidation step serves to oxidize cobaltous values to cobaltic and also to oxidize unsaturated sulphur values to sulphates. Usually, about 15 minutes under the aforesaid conditions is sufficient to effect the required oxidation of the cobalt and sulphur values. If the solution passed to the boiling operation contains any unsaturated sulphur values, these values will oxidize readily during boiling and cause an equivalent amount of trivalent cobalt to reduce to a divalent state.

Any cobalt unconverted to the trivalent state during the leaching operation will be oxidized to a trivalent cobaltic state during the oxidation step. Cobaltic cobalt will not be precipiated when subjected to the subsequent acidification operation whereas the nickel readily precipitates as a complex salt. Thus, nickel values may be readily separated from cobalt in a simple liquid-solids separation step. If, however, the dissolved cobalt is in a divalent state, it too will be precipitated by the acid addition and will report with the nickel precipitate. Thus, the oxidation step should be carried out to achieve substantially complete oxidation of the cobalt values to the cobaltic state.

Solution from the oxidation step is then heated to above its boiling point in a boiling step. As the boiling operation proceeds, free ammonia is driven off and ammonium carbonate in solution breaks down into ammonia and carbon dioxide which separate from the solution and are collected, condensed and recycled to the leach residue washing operation. Since the oxidized leach solution treated in the boiling step contains at least 10 moles of ammonium sulphate per mole of nickel plus cobalt, unlike the boiling operations of the aforementioned prior patents, nickel and cobalt values are not precipitated as basic nickel and cobalt carbonates; rather, stable and soluble nickel and cobalt amine sulphates are formed and remain in the solution.

It is preferable, in order to minimize the consumption of acid in the subsequent acidification step, to effect conversion of substantially all nickel values to nickel diamine sulphate by providing sufficient time in the boiling step to ensure a breakdown of substantially all ammonium carbonate into carbon dioxide and ammonia and elimination thereof in a gaseous state. In most cases at least 15 minutes boiling will be required to obtain the desired effect.

The boiling operation is preferably carried out in a multi-stage distillation tower. The solution is fed to the top of the tower, passes downwardly and countercurrently to a stream of upwardly moving steam introduced into the bottom of the tower. Ammonia and carbon dioxide vapours evolved from the hot solution pass out of the top of the tower and are condensed and collected by conventional procedures and recirculated in the form of ammonium carbonate to the washing and leaching steps.

Upon completion of the boiling step, the solution is treated according to any conventional or unconventional methods to separately recover nickel and cobalt values and regenerate ammonium sulphate for recycle to the leaching operation. There are numerous known procedures which can be employed for this purpose. For example, the solution can be treated by methods, such as that described in United States Patent No. 2,831,763, wherein the solution is contacted with one or more beds of an ion exchange resin to selectively extract the dissolved nickel and produce a substantially nickel-free solution containing 2 moles of ammonium sulphate for each mole of extracted nickel. This solution is then reacted with a sulphidizing agent, such as $H_2S$ to remove the cobalt and any residual nickel values and is then recycled to the quench step to provide the ammonium sulphate requirements for the leaching operation.

Another particularly useful and novel procedure for separately recovering nickel and cobalt from the solution from the boiling operation whilst regenerating ammonium sulphate for use in the leaching operation is shown in the drawing. According to this procedure, solution from the boiling step is allowed to cool and sufficient sulphuric acid is added in a nickel stripping step to lower the pH of the solution. While the bulk of the nickel diammine sulphate precipitates in the form of a nickel double salt ($NiSO_4(NH_4)_2SO_4$) in the pH range below 5.4 to ensure substantially complete precipitation of the nickel diammine sulphate. Crystallization of the nickel double salt does not occur at temperatures above 130° F. thus it is necessary to cool the solution to below this temperature. At 90° F. the concentration of nickel values in the solution can readily be lowered to about 1 gram per litre. The concentration of ammonium sulphate in the solution is also important. The solubility of the nickel double salt decreases rapidly with increasing ammonium sulphate concentration until at a concentration of from 20% to 25% by weight ammonium sulphate, the solubility of nickel sulphate-ammonium sulphate is lowered to about 0.1 gram of nickel per litre of solution. The ammonium sulphate concentration of the solution is maintained such as to minimize the solubility of nickel ammonium sulphate. Cobalt ammine sulphate in the solution is in a trivalent form, is stable in the acidified solution and will not precipitate with the nickel double salt. Accordingly, a nickel sulphate-ammonium sulphate precipitate substantially free of cobalt is produced from the ammoniacal solution from the boiling operation.

The slurry containing nickel double salt precipitate is passed to a liquid-solids separation step and the solution containing dissolved cobalt values and a small quantity of dissolved nickel is treated by contacting the solution with a sulphidizing agent such as $(NH_4)_2S$, $H_2S$, $Na_2S$ or $NaHS$. After addition of the sulphidizing agent, precipitation of the cobalt and residual nickel occurs rapidly and terminates in about 5 to 10 minutes. It is preferred to remove the mixed cobalt-nickel sulphide precipitate from solution after 10 minutes as the precipitated sulphides in the presence of oxygen may redissolve into solution. The precipitation should take place as much as possible in the absence of air as redissolution of the precipitate is accentuated by oxygen. The reaction is conducted at a temperature below about 100° C. and preferably at room temperature. The mixed cobalt-nickel sulphide precipitate is separated from solution by conventional liquid-solid separation methods.

Precipitate from the nickel stripping step is passed to a nickel dissolution and copper stripping step in which the precipitate is redissolved in an aqueous ammoniacal solution containing from about 2 to 4 moles of free ammonia per mole of dissolved nickel and cobalt. $(NH_4)_2S$, $H_2S$ or other sulphide compounds are added in sufficient amounts to combine with the dissolved copper values and preferentially precipitate them as sulphides. The solution is actively agitated under a non-oxidizing atmosphere at a temperature above 100° F. for a period sufficient to form and precipitate copper sulphide which is then separated from the solution.

The copper-free nickel bearing solution is passed to a nickel reduction step in which it is reacted in accordance with known procedures, with a reducing gas such as hydrogen at a temperature above about 150° F. and under a partial pressure of reducing gas greater than about 200 p.s.i. This reducing reaction is continued until substantially all the nickel has been precipitated as a metallic nickel product. After separation of product nickel, the reduction end solution which contains at least 2 moles of ammonium sulphate for each mole of recovered nickel, is recycled to the quench step to provide the ammonium sulphate requirements for the leaching step. Sulphur as well as that added as $H_2SO_4$ in the nickel stripping step contained in the reduction ore will also report in the reduction end solution as ammonium sulphate so there must be a bleed of some reduction end solution in order to maintain the desired ammonium sulphate balance in the system.

EXAMPLE

This example illustrates the desirability of having cobalt in a trivalent form in the acidification step. The example further illustrates the effect of ammonium carbonate concentration on the consumption of acid.

An aqueous solution containing 8.80 g.p.l. nickel and 0.50 g.p.l. cobalt (0.38 g.p.l. $Co^+$ and 0.12 g.p.l. $Co^{+++}$) was divided into four samples. To three samples was added ammonium carbonate in varying amounts and no ammonium carbonate was added to the fourth sample. Each sample was oxidized at 200° F. for one hour using 50 p.s.i.g. $O_2$ then cooled to 100° F. and sufficient acid was added to each sample to lower the pH to 3.0. The solutions were filtered and both the precipitate and filtrate were analyzed. The results are contained in the following Table II.

The results in Table II illustrate that the higher the $Co^{++}$ concentration, the more contaminated the nickel double salt precipitate will be with cobalt. Where the concentration of divalent cobalt was 0.06 the nickel to cobalt ratio in the precipitate was a very satisfactory 1450. Where the concentration was 0.30, the ratio was a very unsatisfactory 37.8. $CO^{++}$ concentration also has an effect on the nickel to cobalt ratio in the filtrate. As the concentration increases, so too does the Ni:Co ratio.

The table also shows that the $(NH_4)_2CO_3$ concentration has a direct bearing on the quantity of $H_2SO_4$ consumed. Where the oxidized solution contained 25 g.p.l. $(NH_4)_2CO_3$, 23 mls. of concentrated $H_2SO_4$ was required to precipitate the $NiSO_4 \cdot (NH)_2SO_4$ salt at pH 3.0 If the oxidized solution is boiled to drive off all free $(NH_4)_2CO_3$ before the $H_2SO_4$ is added, the consumption of $H_2SO_4$ is greatly decreased.

What I claim as new and desire to protect by Letters Patent of the United States is:

1. In a process fo rthe extraction of nickel and cobalt values from oxidic lateritic and garnieritic nickel and cobalt bearing ores in which the ore is roasted to reduce nickel and cobalt values to a metallic state and the reduced ore is leached in an ammoniacal solution to extract nickel and cobalt values therefrom, the improvement which comprises the steps of:
   (a) leaching finely divided particles of said reduced ore at a temperature of from about 80° F. to about 200° F. in an aqueous ammoniacal solution of ammonium carbonate and ammonium sulphate containing, for each mole of nickel plus cobalt in said reduced ore, about 2 to about 5 moles of free ammonia, at least about 1 mole of ammonium carbonate and at least 10 moles of ammonium sulphate;
   (b) separating undissolved residue from the leach solution from Step (a);
   (c) reacting said leach solution with a free oxygen bearing gas to convert divalent cobalt values to trivalent form and to convert unsaturated sulphur values to sulphate form;
   (d) heating solution from Step (c) to a temperature above its boiling point to drive off free ammonia and to break down contained ammonium carbonate into gaseous ammonia and carbon dioxide and expel said gases and to form stable and soluble nickel and cobalt ammine sulphates which remain in solution:
   (e) separately recovering nickel and cobalt values from the solution from Step (d) whilst producing a substantially nickel and cobalt free end solution containing at least 2 moles of ammonium sulphate for each mole of recovered nickel; and
   (f) recycling said end solution to said leaching step in an amount sufficient to provide the ammonium sulphate requirements for said leaching step.

2. The improved process as claimed in claim 1 wherein said aqueous ammoniacal solution in which said reduced ore is leached contains about 2 moles of ammonium carbonate per mole of nickel and cobalt dissolved in said solution.

3. The improved process as claimed in claim 1 wherein said leach solution is allowed to boil for a sufficient length of time to drive off all free ammonia and break down substantially all ammonium carbonate and drive off the resulting gases.

4. The improved process as claimed in claim 3 wherein carbon dioxide and ammonia expelled during said heating step are collected and recycled to the leaching operation.

TABLE II

| Sample | $(NH_4)_2CO_3$ added (q.p.l.) | $(NH_4)_2CO_3$/ Ni + Co molar ratio | $Co^{++}$ conc. (q.p.l.) | Conc. $H_2SO_4$ added to reduce to pH 3.0 (ml./l.) | $NiSO_4 \cdot (NH_4)_2SO_4$, precipitate ||||  Filtrate |||
|---|---|---|---|---|---|---|---|---|---|---|---|
| | | | | | Weight (gms) | Ni, percent | Co, percent | Ni/Co | Ni (q.p.l.) | Co (q.p.l.) | Ni/Co |
| 1 | 50 | 3.3 | 0.06 | 40 | 58 | 14.5 | 0.10 | 1,450 | 0.393 | 0.467 | 0.843 |
| 2 | 25 | 1.64 | 0.07 | 23 | 57 | 14.2 | 0.009 | 1,580 | 0.416 | 0.440 | 0.930 |
| 2 | 10 | 0.66 | 0.22 | 17 | 56 | 14.1 | 0.065 | 217 | 0.511 | 0.449 | 1.06 |
| 4 | 0 | 0 | 0.30 | 15 | 60 | 14.0 | 0.370 | 37.8 | 0.531 | 0.266 | 2.0 |

5. In a process for the extraction of nickel and cobalt values from oxidic lateritic and garnieritic nickel and cobalt bearing ores in which the ore is roasted to reduce nickel and cobalt values to a metallic state and the reduced ore is leached in an ammoniacal solution to extract nickel and cobalt values therefrom, the improvement which comprises the steps of:
(a) leaching finely divided particles of said reduced ore at a temperature of from about 80° to about 200° F. in an aqueous ammoniacal solution of ammonium carbonate and ammonium sulphate containing, for each mole of nickel plus cobalt in said reduced ore, about 2 to about 5 moles of free ammonia, at least about 1 mole of ammonium carbonate and at least 10 moles of ammonium sulphate;
(b) separating undissolved residue from the leach solution from step (a);
(c) reacting said leach solution with free oxygen bearing gas to convert divalent cobalt values to trivalent form and to convert unsaturated sulphur values to sulphate form;
(d) heating solution from Step (c) to a temperature above its boiling point to drive off free ammonia and to break down contained ammonium carbonate into gaseous ammonia and carbon dioxide and expel said gases and to form stable and soluble nickel and cobalt ammine sulphates which remain in solution;
(e) cooling solution from Step (d) to below about 130° F. and adding sulphuric acid thereto in sufficient quantity to precipitate the bulk of the dissolved nickel values as a complex nickel sulphate ammonium sulphate salt;
(f) separating said complex salt from said last mentioned solution;
(g) contacting said last mentioned solution, in the absence of air, with a sulphidizing agent chosen from the group consisting of hydrogen sulphide, ammonium sulphide, sodium sulphide and sodium sulph-hydrate, to precipitate dissolved cobalt and any nickel remaining in solution as a mixed cobalt-nickel sulphide product;
(h) dissolving said complex salt in an aqueous ammoniacal solution; and
(i) recovering nickel values from said solution.

6. The improved process as claimed in claim 5 wherein said aqueous ammoniacal solution in which said reduced ore is leached contains about 2 moles of ammonium carbonate per mole of nickel and cobalt dissolved in said solution.

7. The improved process as claimed in claim 5 wherein the temperature of said aqueous ammoniacal solution in which said reduced ore is leached is in the range of from about 60° F. to about 200° F.

8. The improved process as claimed in claim 5 wherein said leach solution is allowed to boil for a sufficient length of time to drive off all free ammonia and break down substantially all ammonium carbonate and drive off the resulting gases.

9. The improved process as claimed in claim 5 wherein the mixed cobalt-nickel sulphide product produced in Step (g) is separated from the solution from which it is precipitated and said solution is then recycled to the leaching Step (a) in amount sufficient to provide the ammonium sulphate requirements for said leaching step.

References Cited
UNITED STATES PATENTS

| | | | |
|---|---|---|---|
| 3,141,765 | 7/1964 | Brown et al. | 75—103 X |
| 3,088,820 | 5/1963 | Mackin et al. | 75—103 X |
| 2,520,958 | 9/1950 | Poole et al. | 75—103 X |
| 2,647,208 | 8/1953 | Forward | 75—103 X |
| 2,647,828 | 8/1953 | McGarley | 75—103 |
| 2,767,055 | 10/1956 | Schanfelberger | 75—119 UX |
| 2,777,753 | 1/1957 | Schanfelberger et al. | 75—119 X |
| 3,640,706 | 2/1972 | Zubyckyj et al. | 75—103 |
| 3,674,465 | 7/1972 | Ewans et al. | 75—108 |

HERBERT T. CARTER, Primary Examiner

U.S. Cl. X.R.

423—143, 146; 75—103